W. G. FRY & V. A. SEUBERTH.
PULLEY.
APPLICATION FILED OCT. 12, 1917.

1,275,670.

Patented Aug. 13, 1918.

Inventors
William G. Fry
and Victor A. Seuberth,
By
Attorney

UNITED STATES PATENT OFFICE.

WILLIAM G. FRY, OF MILWAUKEE, WISCONSIN, AND VICTOR A. SEUBERTH, OF CHICAGO, ILLINOIS.

PULLEY.

1,275,670.    Specification of Letters Patent.    Patented Aug. 13, 1918.

Application filed October 12, 1917.   Serial No. 196,301.

*To all whom it may concern:*

Be it known that we, WILLIAM G. FRY and VICTOR A. SEUBERTH, both citizens of the United States, residing at Milwaukee, Wisconsin, and Chicago, Illinois, respectively, have invented certain new and useful Improvements in Pulleys, of which the following is a specification.

The object of this invention is to provide a pulley which will avoid the formation of air pockets beneath the belt and thereby prevent slippage and injury to the belt.

A further object of the invention is to provide a pulley of novel construction which will provide a maximum degree of friction and at the same time avoid unnecessary wear on the belt, and which can be made in a variety of ways to suit different conditions and at a comparatively low cost of manufacture.

In the accompanying drawings.

Figure 1:
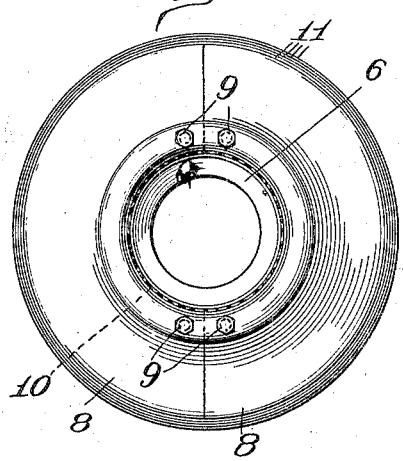
Figure 1 is an end view and Fig. 2 is a sectional view of a pulley embodying our invention and formed of a plurality of disks.
Figure 2:
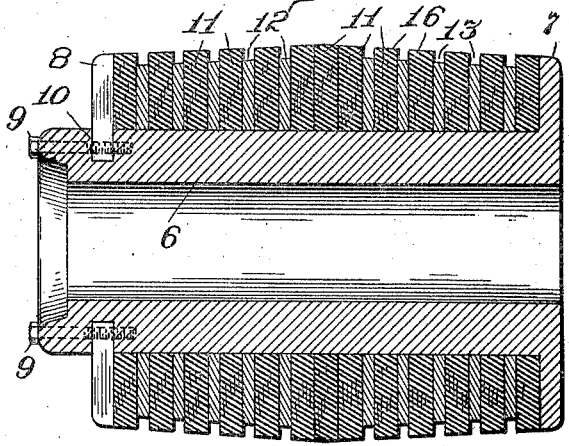

Referring first to Figs. 1 and 2 of the drawing the pulley comprises a suitable core 6 having an end collar 7 which may be integral with the core or otherwise mounted thereon, a split collar 8 removably secured by bolts 9 in a peripheral groove 10 at the opposite end of the core and a plurality of alternating leather members 11 and metal members 12 securely held in place on the core between the collars. The metal members are of less diameter than the leather members to form peripheral grooves 13 between the leather members which will permit the escape of air beneath the belt and prevent the formation of air pockets which cause slippage of the belt. The leather members consist of one or more leather disks which provide a maximum degree of friction for the belt and the metal disks form supports for the leather disks and hold them rigidly in position. The pulley may be crowned as shown in Fig. 2 or made in any other shape and the disks may vary in diameter and thickness as may be found desirable to meet various conditions. The pulley is assembled by arranging the disks on the core against the fixed collar 7 and applying pressure upon the disk from the opposite ends of the core until the split collar 8 can be arranged in the groove 10 to hold the disks in their compressed condition. Then the split pulley is secured in place by bolts 9 or other suitable fastening means.

Figure 3:
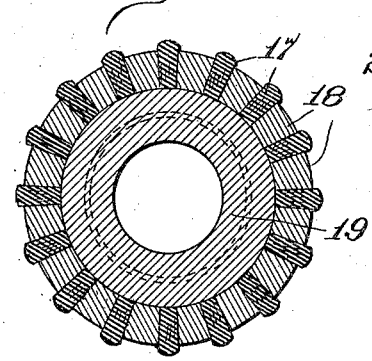
Fig. 3 is a transverse sectional view and Fig. 4 is a longitudinal sectional view of a pulley embodying our invention in a different form.
Figure 4:
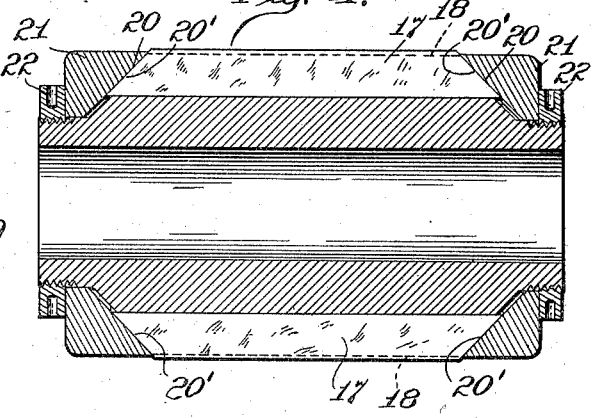
Figure 5:
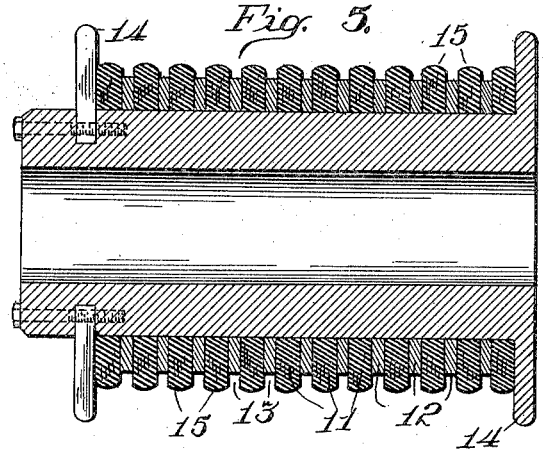
Fig. 5 is a longitudinal sectional view showing the invention in a flanged pulley.

As shown in Fig. 5 the collars may be made in the form of flanges 14 to provide a flanged pulley and the leather disks may be provided with rounded contact surfaces 15 instead of the flat contact surfaces 16 as shown in Fig. 2. In Figs. 3 and 4 I have shown a pulley embodying my invention with leather members in the form of strips 17 and metal members in the form of strips 18 extending longitudinally of the core 19 and alternately disposed around the same. It will be noted that this construction differs from that shown in Fig. 2 in that the alternating leather and metal contact surfaces are arranged longitudinally of the core in Figs. 3 and 4 and peripherally of the core in Fig. 2. The ends of the strips 17 and 18 are beveled at 20' and engaged by bevel faces 20 of collars 21 which are held in place on the core by lock nuts 22 to secure and hold the strips in proper position. As in the construction of Fig. 2 the leather strips 17 project outward beyond the metal strips 18 so that grooves are formed between each pair of leather strips to permit the escape of air from beneath the belt and thereby prevent slippage. The leather strips also project outward beyond the collars 20 so that air may escape at the ends of the grooves formed between the leather strips and beneath the belt.

Our invention provides a pulley of simple and comparatively inexpensive construction which can be readily assembled and which will effectually prevent the formation of air pockets under the belt and in this way will avoid slippage which not only lessens the efficiency of the belt but tends to damage the same. The metal disks extend sufficiently outward from the core to press and sustain the leather disks whose peripheral contact surfaces are separated by the grooves formed therebetween beyond the periphery of the metal disks, and the metal disks provide with the leather disks a strong, substantially solid, compact pulley which will provide a maximum degree of wear. The same is true of the strip construction of Figs. 3 and 4 in which the metal strips extend outward from the core sufficiently to form a brace and solid construction with the leather strips, the latter projecting sufficiently beyond the metal strips to provide grooves for the escape of air beneath the belt. The construction in all the forms illustrated in the drawings is strong and substantial and the parts are securely and rigidly held together so that they will not become loose in use.

We claim:

1. A pulley comprising a core, a plurality of metal members and a plurality of leather members mounted in series on the core, the leather members projecting outward beyond the metal members to form grooves for the escape of air beneath the belt traveling on the pulley, and means for holding all the said members in place on the core.

2. A pulley comprising a core, a plurality of metal parts and a plurality of leather parts mounted in series on said core and having beveled ends, collars mounted on the core and having beveled surfaces to engage the beveled ends of said parts, and means for securing the collars on the core to lock the said parts in place.

WILLIAM G. FRY.
VICTOR A. SEUBERTH.

Witnesses:
WM. O. BELT,
M. A. KIDDIE.

Copies of this patent may be obtained for five cents each, by addressing the "Commissioner of Patents, Washington, D. C."